Patented Oct. 6, 1936

2,056,272

UNITED STATES PATENT OFFICE 2,056,272

WETTING, DETERGENT, AND EMULSIFYING AGENTS

Karl Hennig, Rosslau/Anhalt, Germany, assignor to Deutsche Hydrierwerke Aktiengesellschaft, Berlin-Charlottenburg, Germany, a corporation of Germany No Drawing. Application July 18, 1934, Serial No. 735,863. In Germany July 20, 1933

6 Claims. (Cl. 260—99.12)

This invention relates to superior soap-like products and more particularly refers to wetting, detergent and emulsifying agents containing a superior type of sulfonated alcohols, and methods for their production.

Heretofore, soap-like products have been produced by sulfonating fats, oils and similar substances such as fatty alcohols. These products dissolve with difficulty in cold water, and even at ordinary temperatures their solutions were frequently quite cloudy. Even the alcohol sulfonates were sometimes impracticable to dissolve with the production of clear stable solutions. They are also not stable toward hard water and treating baths when heated.

It is an object of this invention to cure the aforementioned defects and others directly or indirectly resulting therefrom. A further object is to produce soap-like products which dissolve almost instantaneously and produce clear stable solutions even at reduced temperatures. A still further object is to produce new compounds which may be substituted for soap or soap-like products or used in admixture therewith with considerably more satisfactory results. Additional objects will become apparent from a consideration of the following description and claims.

These objects are attained according to the herein described invention which comprises sulfonating at reduced temperatures an alcohol-containing liquid having a solidifying point below 0° C. In a more limited sense the invention comprises sulfonating at temperatures below 30° C. the aforementioned alcohol-containing liquid, this liquid consisting primarily of normal primary alcohols having from eight to eighteen carbon atoms in the molecule. The preferred embodiment of the invention pertains to an initial sulfonation treatment of the above described liquids at temperatures below 0° C., said liquid containing an appreciable amount of unsaturated higher fatty alcohols and preferably having an iodine number above 100.

The invention may be more readily understood by a consideration of the following illustrative examples:

Example 1

To 50 kilos of sulfuric acid (98%) which are preliminarily cooled to about —10° C., introduce gradually 100 kilos of a fat-(grease)alcohol mixture which was obtained by the reduction of herring oil and possesses an iodine number of 105–125 and a solidification point between —5 and —10° C. The speed of the flow of the fat-alcohol is determined by the temperature of the reaction mixture and takes place in such a way that the temperature does not exceed 0° C. at the addition of the first third, 10–15° C. at the second third and 25° C. at the last third of the fat-(grease)alcohol. After the fat substance has been introduced into the sulfonation agent, stir it for about two to three hours; then at about 25° C. add an additional 25 kilos of sulfuric acid (100%) to it. As soon as the sulfonation is finished, i. e. the reaction product clearly dissolves in cold water, neutralize with the suitable quantity of soda lye (mostly 120 kilos of 38% lye). From the light yellow paste obtainable, which is standardized against 30% fat content, aqueous solutions can be produced which at a content of 0.5 gram in one liter of water of 30° German hardness are stable to boiling and also remain clear in the cold at a content of 2 grams per liter of water.

Example 2

50 kilos of sulfuric acid (100%) are cooled to about —10° C. and then, as described in Example 1, slowly compounded with 100 kilos of a mixture consisting of 70 kilos of oleyl alcohol (iodine number 92) and 30 kilos of fat-(grease)alcohols with an iodine number of 135. After stirring for a short time, introduce at temperatures between 20° and 30° C. 20 kilos of chlorsulfonic acid. As soon as the sulfonation is finished and a test shows a clear solubility in water, neutralize in the customary manner which requires about 125 kilos at 38% soda lye. The paste obtainable is readily soluble in water and completely stable toward hard water even when heated.

Example 3

50 kilos of castor oil alcohol with the acetyl saponification number 280, the saponification number 7 and the iodine number 85, are mixed with 80 kilos of oleylalcohol (iodine number 92) and cooled to —5° C. Add 90–95 kilos of sulfuric acid (98%) gradually and during the sulfonation increase the temperature slowly to 30° C. After the fat-(grease)alcohol has been introduced and the mixture stirred for about 2–3 hours test by means of a sample whether the sulfonation is completely finished. As soon as sulfonation is completed add sufficient soda lye to render the product slightly alkaline. The paste obtained corresponds in stability and qualities with the product of Example 1.

Example 4

Cool 50 kilos of 100% sulfuric acid to −5° C., while stirring compound it slowly with 100 kilos of a fat-(grease) alcohol mixture, consisting of 70 kilos of oleyl alcohol (iodine number 92) and 30 kilos of castor oil (first pressing). During the process the temperature may slowly rise to 30° C. After all the fat substance is added to the sulfuric acid, and after stirring for one hour sulfurize with an additional 20 kilos of chlorsulfonic acid. Ordinarily sulfonation is completed after the addition of chlorsulfonic acid, and neutralization can take place in the customary manner, on the average 105 kilos of 38% soda lye being required. The paste obtained is then standardized against a fat content of 30%. It was found to be readily soluble with the formation of a clear, stable solution having excellent wetting, detergent and emulsifying properties.

Example 5

Products similar to those described in the preceding examples are obtained if a mixture consisting of 80 kilos of fat-(grease) alcohols (iodine number 133) obtained by the reduction of herring oil, and 20 kilos of oleyl alcohol with the iodine number 52, which accordingly contains constituents of cetyl alcohol and/or stearyl alcohol, respectively, is employed for the sulfonation.

The sulfonate obtained in paste form according to the aforementioned examples can also in the usual way be worked into dry, powdery products, or alone, or in combination with other known, soapy substances or dyestuffs, filling- or odoriferous substances, respectively, into compact pieces of any form desired.

It is to be understood that the aforementioned examples are given merely to facilitate one in obtaining the objectives of the present invention, and are not intended as a limitation thereon. In place of the alcohols referred to in these examples or in addition thereto numerous other alcohols might be utilized. These alcohols may advantageously be obtained from natural sources such as vegetable oils, oils and waxes derived from fish and other marine animals, oils, fats and waxes derived from animals, etc. The means of converting the aforementioned natural substances into alcohols are well known and do not comprise a portion of the present invention. Briefly, they comprise the sodium or catalytic reduction of said substances, and also include the saponification of substances which are capable of being converted to normal primary unsaturated alcohols by such treatment. Among the alcohols which are produced by these processes mention may be made of oleyl alcohol, lower homologues of oleyl alcohol, alcohols obtainable by reduction of herring oil, ricinoleyl alcohol, linoleyl alcohol and so on.

In order that sulfuric esters may be formed in preference to true sulfonates it is advisable that the initial stages of sulfonation be carried out at exceedingly low temperatures, preferably below 0° C. After the initial stages of sulfonation the temperature may rise somewhat but should usually be prevented from rising much higher than 30° C. Sulfonation in accordance with these instructions is advisably accomplished by selecting a liquid which does not solidify at temperatures above 0° C. Individual components of this liquid may, of course, have a higher solidifying point but as long as the solidifying point of the mixture is below 0° C. it is contemplated for use herein.

Liquids which fulfill the aforementioned requirements are conveniently produced by the use of appreciable quantities of highly unsaturated alcohols. In place of or in addition to such alcohols very satisfactory results may also be obtained by the utilization of alcohols which have hydroxyl groups in place of the double bonds. Alcohols coming within this category and particularly contemplated herein are ricinoleyl alcohol, alcohols obtainable by reduction of grape seed oil and the polybasic alcohols obtained by hydration of linoleyl and oleyl alcohol. To these alcohols may be added varying amounts of compounds which upon sulfonation possess wetting, emulsifying, detergent and similar properties. Compounds which are adapted for such use are unsaturated alcohols, for example those unsaturated alcohols referred to supra, as well as their homologues and isomers and/or polyhydroxy derivatives and other unsaturated fatty substances such as castor oil, grape seed oil, unsaturated fatty acids and so on. It is to be understood, however, that the invention is not limited thereto since additional compounds capable of sulfonation with the production of soap-like products may also be selected for use in accordance with the instructions of the present invention.

Exceptionally satisfactory results may be achieved by the use of an alcohol-containing liquid which not only has a solidifying point of below 0° C. but also has an iodine number of 100 or more. Such a liquid may be obtained by the use of individual components all of which are highly unsaturated. It may likewise be produced by the use of highly unsaturated components in admixture with less unsaturated or even with saturated components, the highly unsaturated character of the first component resulting in a liquid the net iodine number of which is 100 or greater.

Sulfonation of the aforementioned liquids may be accomplished according to customary methods, for example, by treatment with concentrated sulfuric acid, oleum and/or chlorsulfonic acid. The use of organic diluents and/or agents having an avidity for water is frequently helpful although not essential in this reaction. As previously mentioned, this sulfonation treatment should be carried out at reduced temperatures, particularly temperatures under 30° C. For optimum results, it is generally advisable to commence sulfonation at a temperature below 0° C., the treatment being completed at higher temperatures. By following these instructions a very uniformly sulfonated product is obtained which contains an exceedingly high percentage of sulfuric esters.

The sulfonated products are preferably neutralized by salt-forming constituents which results in the production of water-soluble salts. Soda ash or soda lye is admirably adapted for this purpose. However, other salt-forming constituents are contemplated, for instance salts or hydroxides of ammonium, potassium, lithium, magnesium, calcium, copper, tin, etc. In place of or in addition to the aforementioned constituents water-soluble salts of the sulfonated derivatives previously described may be produced by the use of compounds of organic origin. Representative examples of such compounds are pyridine, piperidine, mono- and dimethylamine, cyclohexylamine, mono-alkyl-cyclohexylamine, etc.

The present invention permits the production of superior soap-like products. These products are more uniform, readily soluble and stable than prior art sulfonated compounds. They may be produced from a large variety of sources, such as normal primary unsaturated alcohols or mixtures of these alcohols with other unsaturated fatty substances and/or higher molecular hydroxyl substituted substances. They are exceptionally well adapted for use in the numerous processes wherein soap and soap-like substances have been used in the past. Their wetting, emulsifying and detergent properties are surprisingly good under a wide variety of conditions. While these compounds may be substituted for soap or soap-like products they may also be used in admixture therewith.

As many apparently widely different embodiments of this invention may be made without departing from the spirit and scope thereof, it is to be understood that the invention is not limited to the specific embodiments thereof except as defined in the appended claims.

What I claim is:

1. A process for producing wetting, detergent and emulsifying agents which comprises sulfonating at about 0° C. a mixture of normal primary alcohols which solidify below 0° C. and have more than 8 carbon atoms in the molecule, the iodine number of the alcohols being at least about 100.

2. The process defined in claim 1 wherein the sulfonation treatment is completed at more elevated temperatures.

3. A process for producing a wetting, detergent and emulsifying agent which comprises initially sulfonating at about 0° C. a mixture of higher fatty alcohols having a solidifying point below 0° C., and containing more than eight carbon atoms in the molecule, said mixture having an iodine number greater than 100, and completing the sulfonation at a temperature greater than 20° C.

4. A process for producing a wetting, detergent, and emulsifying agent which comprises sulfonating at about 0° C. a mixture of higher fatty alcohols obtained by reduction of herring oil, containing more than eight carbon atoms in the molecule, and having a solidifying point below 0° C. and an iodine number greater than 100; completing the sulfonation at a temperature greater than 20° C., and neutralizing the reaction product with soda lye.

5. A process for producing a wetting, detergent, and emulsifying agent which comprises sulfonating at about 0° C. a mixture of higher fatty alcohols containing more than eight carbon atoms in the molecule, said mixture containing a major proportion of oleyl alcohol and having a solidifying point below 0° C. and an iodine number greater than 100; completing the sulfonation at a temperature greater than 20° C., and neutralizing the reaction product with soda lye.

6. A process for producing a wetting, detergent, and emulsifying agent which comprises sulfonating at about 0° C. a mixture of higher fatty alcohols containing more than eight carbon atoms in the molecule, said mixture containing substantial proportions of oleyl alcohol and alcohols obtained by the reduction of herring oil, and having a solidifying point below 0° C. and an iodine number greater than 100; and neutralizing the reaction product with soda lye.

KARL HENNIG.